(12) United States Patent
Ledingham et al.

(10) Patent No.: US 10,094,495 B2
(45) Date of Patent: Oct. 9, 2018

(54) PIPE COUPLING MAKE UP ASSEMBLY

(71) Applicant: MorphPackers Limited, Aberdeen (GB)

(72) Inventors: Michael Ledingham, Peterhead (GB); David Glen Martin, Keith (GB)

(73) Assignee: MORPHPACKERS LIMITED (GB)

( * ) Notice: Subject to any disclaimer, the term of this patent is extended or adjusted under 35 U.S.C. 154(b) by 135 days.

(21) Appl. No.: 15/500,904

(22) PCT Filed: Aug. 3, 2015

(86) PCT No.: PCT/GB2015/052238
§ 371 (c)(1),
(2) Date: Jan. 31, 2017

(87) PCT Pub. No.: WO2016/020658
PCT Pub. Date: Feb. 11, 2016

(65) Prior Publication Data
US 2017/0219137 A1 Aug. 3, 2017

(30) Foreign Application Priority Data

Aug. 3, 2014 (GB) .................................. 1413734.3

(51) Int. Cl.
*E21B 19/16* (2006.01)
*F16L 13/14* (2006.01)
(Continued)

(52) U.S. Cl.
CPC ............ *F16L 13/141* (2013.01); *E21B 17/02* (2013.01); *E21B 17/04* (2013.01); *E21B 19/10* (2013.01); *E21B 19/16* (2013.01)

(58) Field of Classification Search
CPC ....... F16L 13/141; E21B 19/16; E21B 19/161
See application file for complete search history.

(56) References Cited

U.S. PATENT DOCUMENTS 4,026,006 A * 5/1977 Moebius ................ B21D 39/04
29/508
4,328,982 A 5/1982 Christianson
(Continued)

FOREIGN PATENT DOCUMENTS

DE 20 2004 016655 1/2005
GB 2503344 A 12/2013

OTHER PUBLICATIONS

Intellectual Property Office, Combined Search and Examination Report for GB1513644.3, Jan. 19, 2016, entire document, Intellectual Property Office, United Kingdom.
(Continued)

*Primary Examiner* — Shane Bomar
(74) *Attorney, Agent, or Firm* — Law Office of Jesse D. Lambert, LLC

(57) ABSTRACT

A pipe coupling make up assembly and a method of making up a pipe coupling between tubular sections at a well. A first tubular section in a tubular string at the well is gripped and supported in the assembly. A second tubular is supported and moved to locate a first end of the second tubular section into an expanded first end of the first tubular section. A swaged die is arranged around the first tubular section and forced along the first tubular section towards the second tubular section. This causes the expanded first end to move radially inwards under elastic and plastic deformation and create a metal to metal seal between the first ends of the first and second tubular sections.

20 Claims, 2 Drawing Sheets

(51) Int. Cl.
*E21B 17/02* (2006.01)
*E21B 17/04* (2006.01)
*E21B 19/10* (2006.01)

(56) References Cited

U.S. PATENT DOCUMENTS

| | | | |
|---|---|---|---|
| 4,371,199 A | 2/1983 | Kushner et al. | |
| 5,080,406 A * | 1/1992 | Hyatt | B21D 39/04 |
| | | | 285/330 |
| 2004/0227346 A1 * | 11/2004 | Jamison | B25B 27/10 |
| | | | 285/381.3 |
| 2011/0220237 A1 * | 9/2011 | Okamoto | B21C 1/22 |
| | | | 138/140 |
| 2016/0047501 A1 * | 2/2016 | Kawahara | B21D 39/04 |
| | | | 285/382 |

OTHER PUBLICATIONS

European Patent Office as Int'l Search Authority, International Search Report and Written Opinion for PCT/GB2015/052238, dated Nov. 19, 2015, entire document, European Patent . . . Office, Netherlands.

* cited by examiner

PIPE COUPLING MAKE UP ASSEMBLY

The present invention relates, in general, to equipment used in the exploration and production of oil and gas wells and, in particular, to an apparatus and method for coupling tubular sections on a well platform or rig.

In the exploration and production of oil and gas wells, tubulars in the form of tubing, pipe, casing and liner are run into the well bore. As the depth of each well bore can be hundreds of meters, the tubulars are manufactured in fixed lengths and then they require to be joined together at the well.

The current method of joining tubulars together is to use a screw threaded connection to form a tubular string for insertion in the well bore. In order to achieve this type of connection each tubular member is manufactured with a box section at a first end and a pin section at the opposing end having respective male and female screw threads. The outer surface at the ends of the tubulars are keyed to allow one tubular to be held in place while the second tubular is turned so as to mate with the first and make-up the threaded connection. Automated systems for the make-up of these threaded tubulars on well platforms have been developed which use a first tong to hold a lower tubular in place; a lifting system to position an upper tubular in alignment with the lower tubular; and power tongs located on the upper tubular to turn it so as to engage the screw threads and apply sufficient torque to make-up the threads.

There are major disadvantages in the use of threaded connections: if the tubular string becomes stuck in the well bore, the string cannot be rotated counter to the direction of the screw thread as the connection may come apart; a standard screw threaded connection may not provide a reliable seal between the inside of the tubulars and the outside of the tubulars at the connection as a fluid path can exist along the helical screw thread; and the threads can be prone to make up problems, requiring the use of dope (lubricant and sealant) and thus have a complex supply chain.

Further difficulties are apparent in the make-up of the threaded connection and particularly in automating the process: the weight of the upper tubular must be prevented from being set down on the threads of the lower tubular as this will crush them; the threads need to be aligned to take up the connection requiring careful positioning; the upper tubular must be controlled to rotate through a known number of turns over a given number of threads per inch; and the torque applied must be sufficient to secure the connection without over torqueing which would damage the threads.

To overcome the disadvantages of threaded connections, the present applicants have proposed a pipe coupling described in GB2503344 as a coupling system between tubulars such as tubing, pipes, casing and liner for location in a well bore in which profiled sections on the tubulars are connected using a radially applied force to morph the sections and form a metal to metal sealed connection. Embodiments are provided in which the profiled sections are grooved and/or tapered, additional profiles are provided to prevent relative rotation of the tubulars, the radial force is applied inwardly, outwardly or in both directions, and a connector is used as an additional tubular member to form the coupling. This pipe coupling is suitable for all applications where the tubing will be left in the wellbore, such as casing and liner strings.

It is an object of the present invention to provide a pipe coupling make up assembly for use at a well which mitigates at least some of the disadvantages of the prior art.

It is a further object of the present invention to provide a method of connecting tubular sections at a well which mitigates at least some of the disadvantages of the prior art.

According to a first aspect of the present invention there is provided a pipe coupling make up assembly for connecting tubular sections at a well, the assembly comprising:

a first gripping means to support a first tubular section;

a second gripping means to position and support a second tubular section relative to the first tubular section;

a swaged die having an inner cylindrical surface matched to an outer surface of the first tubular section;

a drive means to move the swaged die relative to the first and second tubular sections so as to force an expanded end of the first tubular section radially inwards and create a metal to metal seal between the first and second tubular sections.

In this way, a pipe coupling is formed at a well without requiring rotation of either tubular section or monitoring of weights, thread counts and applied torque.

Preferably the drive means moves the swaged die parallel to a longitudinal axis of the first and second tubular sections. In this way, the metal to metal seal is created uniformly by elastic and plastic deformation rather than by crimping. The drive means may be mechanical or hydraulic. A plurality of pistons may be used. As the swaged die is moved parallel to the tubular sections, the assembly takes up a smaller footprint than the prior art make up assemblies.

Preferably the gripping means comprises one or more clamps arranged around each tubular. The gripping means may be mechanical or hydraulic. In this way, the first tubular section can be held in place while the second tubular section is held and positioned to be in an end of the first tubular section. Alternatively, the gripping means includes slips as are known in the art to contact the outer surface of the tubular sections. This removes the requirement for the tubular sections to be keyed and also allows quick release of the tubular sections once the coupling is made-up.

Preferably, the assembly includes a cutting head for removing an end of a tubular section. In this way, if an end of a tubular or a pipe coupling is unsatisfactory, it can be removed at the well and the tubular section redressed for another connection.

Preferably, the assembly includes a swage device, the swage device including an expander to expand an end of a tubular section. In this way, a tubular section can be redressed at the well or a plain tubular can be prepared for coupling at the well.

Advantageously, the second gripping means is arranged on a pivoted mount. In this way, the second gripping means can be brought in to support the second tubular section once the second tubular section has been brought to the first tubular section.

The second gripping means may be a swivel to allow positioning of the second tubular section. In this way, the second tubular section can be picked up from a pipe rack and moved around the platform or rig floor such as over the mousehole as required. The swivel may be that present on a platform suspended from the derrick.

According to a second aspect of the present invention there is provided a method of making up a pipe coupling between tubular sections at a well, comprising the steps:

(a) gripping a first tubular section in a tubular string at the well;

(b) supporting a second tubular section and moving the second tubular section to the first tubular section;

(c) locating a first end of the second tubular section into an expanded first end of the first tubular section;

(d) arranging a swaged die around the first tubular section;

(e) forcing the swaged die along the first tubular section towards the second tubular section; and (f) causing the expanded first end to move radially inwards under elastic and plastic deformation and creating a metal to metal seal between the first ends of the first and second tubular sections.

In this way, a pipe coupling is formed at a well without requiring rotation of either tubular section or monitoring of weights, thread counts and applied torque.

Preferably in step (e) the swaged die is forced to move by mechanical means. Alternatively, the swaged die is forced to move by hydraulic means. Preferably also, the swaged die moves parallel to a longitudinal axis of the first and second tubular sections. In this way, the metal to metal seal is created uniformly by elastic and plastic deformation rather than by crimping. As the swaged die is moved parallel to the tubular sections, the assembly takes up a smaller footprint than the prior art make up assemblies.

Preferably in step (a) the first tubular section is clamped. Preferably in step (b) the second tubular section is clamped. The clamping action may be mechanical or hydraulic. In this way, the first tubular section can be held in place while the second tubular section is held and positioned to be in an end of the first.

Preferably, the method includes the step of removing an end of a tubular section. This may be done by use of a cutting head. In this way, if an end of a tubular or a pipe coupling is unsatisfactory, it can be removed at the well and the tubular section redressed for another connection.

Preferably, the method includes the step of swaging the first tubular section to create the expanded first end. In this way, a tubular section can be redressed at the well or a plain tubular can be prepared for coupling at the well.

Advantageously, the method includes the step of swaging the second tubular section to create an expanded end. In this way, when the first and second tubular sections are swaged together the resulting connection can provide a throughbore which approximately matches that of the throughbores of the first and second tubular sections.

Preferably, the method includes the step of picking up the second tubular member from a pipe rack. The method may also include the step of moving the second tubular section around the platform or rig floor such as over the mousehole as required.

In the description that follows, the drawings are not necessarily to scale. Certain features of the invention may be shown exaggerated in scale or in somewhat schematic form, and some details of conventional elements may not be shown in the interest of clarity and conciseness. It is to be fully recognized that the different teachings of the embodiments discussed below may be employed separately or in any suitable combination to produce the desired results.

Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

All numerical values in this disclosure are understood as being modified by "about". All singular forms of elements, or any other components described herein including (without limitations) components of the apparatus are understood to include plural forms thereof.

Embodiments of the present invention will now be described, by way of example only, with reference to the accompanying drawings of which:

Figure 1:
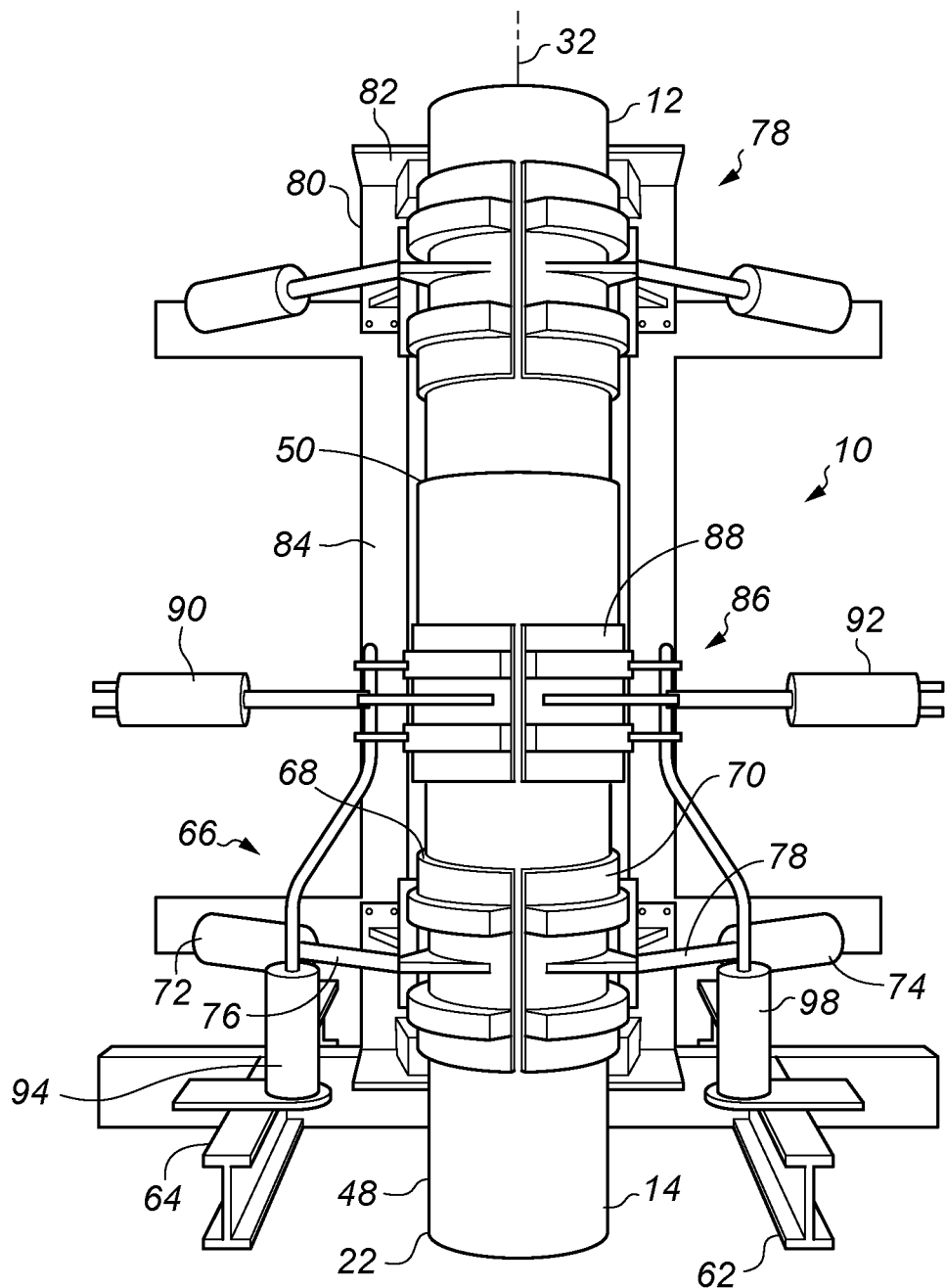
FIG. 1 is a schematic illustration of a pipe coupling make-up assembly according to an embodiment of the present invention.

Referring initially to FIG. 1 of the drawings there is provided a pipe coupling make up assembly, generally indicated by reference numeral 10, for providing a connection between a first tubular section 12 and a second tubular section 14 at a well (not shown) according to an embodiment of the present invention.

Assembly 10 is formed as a compact frame 62 which is preferably located on a platform or rig at the position where a tubing string 22 is being run into the well. The second tubular section 14 is the uppermost section of the tubular string and it's lower end (not shown) will be the last made-up connection or joint in the tubular string 22.

Located upon the base 64 of the frame 62 is a lower clamp 66. Lower clamp 66 has two gripping sections 68,70 which are shaped to match an outer surface 48 of the second tubular section 14 so that, when forced against the surface 48, they will hold and support the second tubular section 14 which may be suspended in the wellbore. Pistons 72,74 will provide a radial hydraulic force upon the gripping sections 68,70 via operating arms 76,78 respectively. The radial force is applied perpendicularly to a central longitudinal axis 32 of the tubular string 22. Those skilled in the art will appreciate that other forms of gripping mechanisms may be used, such as slips, to mechanically hold the second tubular section 14 in position on the rig floor.

A similar upper clamp 78 is located at an upper end 80 of the frame 62. The upper clamp 78 holds the first tubular section 12 in an identical manner to the lower clamp 66. The first tubular section 12 will be the next section of the tubular string 22 which is required to be made up and connected to an upper end 50 of the second tubular section 14. The frame 62 includes a pivoted assembly 82 which allows the first tubular section 12 to be moved into position after the tubular string 22 is run-in the well and the upper end 50 of the second tubular section 14 has dropped to a central location 84 of the frame 62. An upper end (not shown) of the first tubular section 12 may be connected to a swivel as is known in the art to support and bring the first tubular section 12 into position. A lower end 28 of the first tubular section 12 is positioned in the upper end 50 of the second tubular section 14.

Figure 2A:
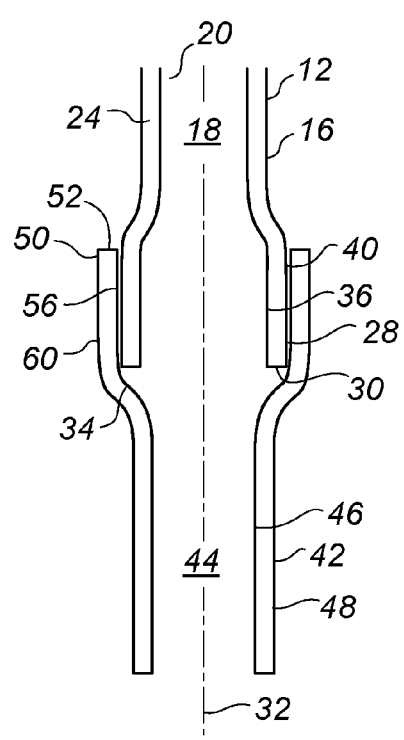
FIG. 2(a) is a half cross-sectional view of a coupling to be made up with the make-up assembly of FIG. 1.

Reference is now made to FIG. 2(a) to describe the arrangement at the ends 28,50 of the first and second tubular sections 12,14 where the connection is to be made.

The first tubular section 12 has a substantially cylindrical body 16 having a bore 18 therethough providing an inner surface 20 with a first diameter and an outer surface 24 with a second diameter along a majority of it's length. The length lies along a central longitudinal axis 32 of the bore 18 and the diameter is perpendicular to this. The body 16 of first tubular section 12 is of metal construction and has dimensions typical of tubulars found in the oil and gas industry as used in tubing strings, casings and liners. The first tubular section 12 has a first end 28 with an annular end face 30 which is substantially perpendicular to the longitudinal axis 32 of the bore 18.

The first end 28 is radially expanded from the body 16 providing an increased inner diameter to the inner surface 36 of the first end 28 and an increased outer diameter to the outer surface 40 of the first end 28. Preferably the wall thickness at the first end 28 is the same or substantially similar to the wall thickness of the body 16.

The second tubular section 14 has a substantially cylindrical body 42 having a bore 44 therethough providing an inner surface 46 with the same diameter as the diameter of inner surface 20 of the body 16 of the first tubular section 12. Similarly the outer surface 48 has a diameter which is the same as the diameter of the outer surface 24 of the body 16 of the first tubular section 12. Thus the body 16 of the first tubular section 12 and the body 42 of the second tubular section 14 have the same dimensions. The body 42 of the second tubular section 14 is also of metal construction and has dimensions typical of tubulars found in the oil and gas industry as used in tubing strings, casings and liners. The second tubular section 14 has a second end 50 with an annular end face 52 which is substantially perpendicular to the longitudinal axis 32 of the bore 44. It is noted that the bores 18,44 are collinear on the longitudinal axis 32, when arranged for connection.

The second end 50 is also radially expanded from the body 42 providing an increased inner diameter to the inner surface 56 of the second end 50 and an increased outer diameter to the outer surface 60 of the second end 50. Preferably the wall thickness at the second end 50 is the same or substantially similar to the wall thickness of the body 42. The diameters of the end 50 of the second tubular section 14 are greater than the diameters of the end 28 of the first tubular section 12, so that the end 28 can be inserted into the end 50.

The ends 28, 50 may be profiled, if desired, to improve the connection. Additionally the ends 28,50 may be oppositely tapered to reduce the thickness of the combined tubulars at the connection. Grooves and rims may also be located on the surfaces 56,40, though these should be entirely circumferential and not provide a helical path for the passage of fluid through the connection as would be found in a screw thread. Such arrangements are described in GB2503344 which is incorporated herein by reference.

At the central position 84 of the frame 62 is a swaging assembly 86. Assembly 86 has a swaged die 88 sized to the outer surface 48 diameter of the second tubular section 14, which is also the diameter at the outer surface 40 of the first tubular section 12. A first set of pistons 90,92 provide a radial hydraulic force to maintain the die 88 against the outer surface 48. Like the clamps 76,78, the first set of pistons 90,92 apply a force perpendicularly to the longitudinal axis 32. A second set of 94,98 apply a force on the swaged die 88 which is parallel to the longitudinal axis 32. This longitudinal force is used to drive the die 88 over the surface 48 and, more particularly, over the outer surface 60 of the end 50 of the second tubular section 14, so as to force the expanded section radially inwards. Thus the die 88 is arranged to be driven upwards towards and onto the first tubular section 12.

In use, with the clamps 66,78 holding each section 12,14, the first end 28 of the first tubular section 12 is inserted into the second end 50 of the second tubular section 14 until the end face 30 at the end 28 of first tubular section abuts the stop at the base 34 of the expanded portion of the second tubular section 14. As there are no screw threads, any amount of weight may be set down on the second tubular section 14. Additionally, no rotational alignment is required between the sections 12,14. Thus, the present invention greatly simplifies and speeds up the make-up process as compared to the prior art screw-threaded connections. This is the arrangement shown in FIGS. 1 and 2(a). A metal to metal seal is then created between the surfaces 56,40 at the first end 28 of the first tubular section 12 and the second end 50 of the second tubular section 14. This is achieved by applying force to the outer surface 60 at the second end 50 of the second tubular section 14.

This inward radial force is applied by the swage die 88. The swage die 88 is fitted around the outer surface 48 of the second tubular section 14 on the body 42. The tubulars 12,14 are then moved relative to the swage die 88 to cause the die to move over the outer surface 60 of the second end 50. This is achieved by use of the longitudinally applied pistons 94,98. As the inner diameter of the swage die 88 is fixed to the diameter of the body 42, the second end 50 will be elastically deformed and move radially inwards so that the second end 50 is morphed into the first end 28. As a metal to metal seal is created between the elastically deforming ends 28,50 of the first and second tubular members 12,14, the first end 28 of the first tubular section 12 is also moved radially inwards.

When the die 88 has passed over the ends 28,50 it can pass onto body 16 of the first tubular section 12 as the outer diameter of body 16 is the same as that of body 42.

Figure 2B:
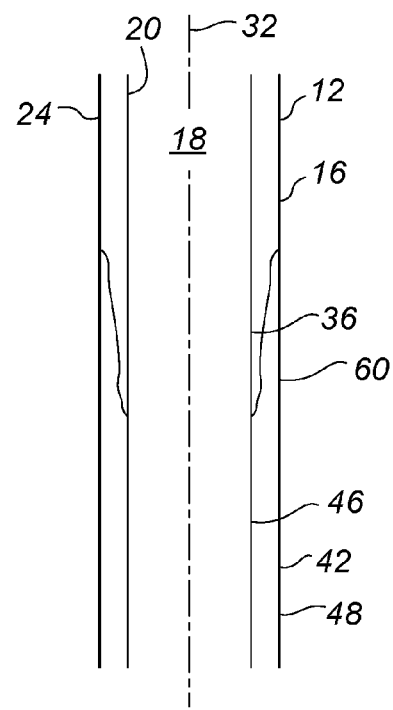
FIG. 2(b) is a half cross-sectional view of the coupling of FIG. 2(a) as a made-up joint.

Referring now to FIG. 2(b), the made-up connection of coupling between the tubular section 12,14 can be seen. The outer surfaces 24,40,60,48 are now substantially continuous with a diameter matching the bodies 16,42 of the tubular sections 12,14. Ideally, the inner surfaces 20,36,56,46 are now substantially continuous with a diameter matching the bodies 16,42 of the tubular sections 12,14.

In an embodiment, the ends 28,50 are tapered with opposing rims and grooves arranged on the tapered surfaces. As the ends 28,50 are brought together each rim is forced into a corresponding groove making an interference fit to provide a metal to metal seal. This produces a very high contact pressure which elastically deforms both the first 12 and second 14 tubular sections at the contact points. Pressure can be applied to plastically deform the section 14 exposed to the radial force while the opposite section 12 will elastically contract and tighten the seal by placing tension on the section 14 when the pressure is released.

It will be readily apparent that the tubular members 12,14 may be identical with each having a first end 28 and a second end 50. By coupling successive tubular members 12,14 together the tubing string 22 can be rapidly formed. If the body 16,42 of the identical tubular members 12,14 is selected to be a standard size used in the oil and gas exploration and production, the tubing string can then be used as a drill string, casing string or liner string, for example. The resulting string will have a continuous inner and outer surface with a uniform bore therethrough. The use of pin and box sections is removed so that there are no protrusions from the cylindrical body of the string. Additionally, by morphing the sections 12,14 together, there is no requirement to rotate the upper section 12, or apply a torque, which would need to be carefully controlled. The morphing pressure is controlled by the force applied by the pistons 90,92 and 94,96. This can be pre-set to provide consistent repeatability as a tubing string 22 is made-up and run-in the well.

In an embodiment, the assembly 10 also includes a cutting head. As the first and second tubular sections 12,14 are brought together for the first end 28 to be inserted in the second end 50, their respective ends 28,50 can be inspected. If either or both is found unsatisfactory, the expanded end 28,50 may be removed using a cutting head which can be pivoted on the frame 62 to engage each section 12,14 at a point on the body 16,42 and remove the end of the tubular section. An additional clamp may be incorporated to hold the end to be cut-off so that it is supported during the cutting process and removed thereafter. Similarly, if the made-up connection between the sections 12,14 is inspected and found to be unsatisfactory, the coupling section can be cut-away to leave the two tubular section 12,14 with ends having diameters which match their respective bodies 16,42.

In the embodiment, or a further embodiment, the assembly 10 includes a swage device being an expander. The expander is a cone which can be rotated through 180 degrees so that it can be driven upwards into the first end 28 of a first tubular section 12 or driven downwards into the second end 50 of a second tubular section 14. The size of the cone will be interchangeable, or there may be two cones, to provide expansion of the ends 28,50 to the required diameters to make-up the connection. This arrangement allows a tubular section to be redressed at the well or a plain tubular can be prepared for coupling at the well.

The principle advantage of the present invention is that it provides a pipe coupling make-up assembly and method of forming a pipe coupling at a well without requiring rotation of either tubular section or monitoring of weights, thread counts and applied torque.

A further advantage of an embodiment of the present invention is that it provides a pipe coupling make-up assembly and method of forming a pipe coupling at a well in which the connection between the tubular sections has an inner and outer diameter matching the tubular string.

A yet further advantage of at least one embodiment of the present invention is that it provides a pipe coupling make-up assembly and method of forming a pipe coupling at a well in which a metal to metal seal is provided at the connection between the tubular sections.

It will be appreciated by those skilled in the art that modifications may be made to the invention herein described without departing from the scope thereof. For example, while the tubular members have been described as metal structures, only the end portions need to have metal to form the seal and thus the tubular members may be of composite form with metal ends. While both ends are described as being expanded, only a single end may be expanded if the wall thicknesses of the tubulars at the connection will not appreciably impede passage through the bore following morphing. Additionally, although probably not necessary as the seal is made up outside the well bore, a compliant material being a sealant, foam or gel can be located between the surfaces at the connection, the material being compressed when the coupling is made-up.

The invention claimed is:

1. A pipe coupling make up assembly for connecting tubular sections at a well, the assembly comprising:
   a first gripping means to support a first tubular section;
   a second gripping means to position and support a second tubular section relative to the first tubular section;
   a swaged die having an inner cylindrical surface matched to an outer surface of the first tubular section;
   a drive means to move the swaged die relative to the first and second tubular sections so as to force an expanded end of the first tubular section radially inwards and create a metal to metal seal between the first and second tubular sections.

2. A pipe coupling make up assembly according to claim 1 wherein the drive means moves the swaged die parallel to a longitudinal axis of the first and second tubular sections.

3. A pipe coupling make up assembly according to claim 1 wherein the drive means is mechanical.

4. A pipe coupling make up assembly according to claim 1 wherein the drive means is hydraulic.

5. A pipe coupling make up assembly according to claim 1 wherein the drive means comprises a plurality of pistons.

6. A pipe coupling make up assembly according to claim 1 wherein the gripping means comprises one or more clamps arranged around each tubular.

7. A pipe coupling make up assembly according to claim 6 wherein the gripping means is mechanical.

8. A pipe coupling make up assembly according to claim 6 wherein the gripping means is hydraulic.

9. A pipe coupling make up assembly according to claim 1 wherein the gripping means includes slips to contact the outer surface of the tubular sections.

10. A pipe coupling make up assembly according to claim 1 wherein the assembly includes a cutting head for removing an end of a tubular section.

11. A pipe coupling make up assembly according to claim 1 wherein the assembly includes a swage device, the swage device including an expander to expand an end of a tubular section.

12. A pipe coupling make up assembly according to claim 1 wherein the second gripping means is arranged on a pivoted mount.

13. A pipe coupling make up assembly according to claim 12 wherein the second gripping means is a swivel to allow positioning of the second tubular section.

14. A pipe coupling make up assembly according to claim 13 wherein the swivel is suspended from a derrick on a platform.

15. A method of making up a pipe coupling between tubular sections at a well, comprising the steps:
   (a) gripping a first tubular section in a tubular string at the well;
   (b) supporting a second tubular section and moving the second tubular section to the first tubular section;
   (c) locating a first end of the second tubular section into an expanded first end of the first tubular section;
   (d) arranging a swaged die around the first tubular section;
   (e) forcing the swaged die along the first tubular section towards the second tubular section; and
   (f) causing the expanded first end to move radially inwards under elastic and plastic deformation and creating a metal to metal seal between the first ends of the first and second tubular sections.

16. A method according to claim 15 wherein the swaged die moves parallel to a longitudinal axis of the first and second tubular sections.

17. A method according to claim 15 wherein the method includes the step of removing an end of a tubular section.

18. A method according to claim 17 wherein a cutting head is used to remove the end of the tubular section.

19. A method according to claim 15 wherein the method includes the step of swaging the first tubular section to create the expanded first end.

20. A method according to claim 19 wherein the method includes the step of swaging the second tubular section to create an expanded end.

* * * * *